United States Patent
Yasui et al.

(10) Patent No.: US 6,729,697 B2
(45) Date of Patent: May 4, 2004

(54) BRAKING FORCE CONTROL DEVICE

(75) Inventors: Yoshiyuki Yasui, Kariya (JP); Takashi Yonekawa, Mishima (JP); Akira Tanaka, Anjyo (JP); Hideyuki Suzuki, Aichi-ken (JP); Mamoru Sawada, Yokkaichi (JP)

(73) Assignees: Aisin Seiki Kabushiki Kaisha, Kariya (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/824,835

(22) Filed: Apr. 4, 2001

(65) Prior Publication Data

US 2002/0005662 A1 Jan. 17, 2002

(30) Foreign Application Priority Data

Apr. 5, 2000 (JP) .......... 2000-103128

(51) Int. Cl.[7] .................................. B60T 8/60
(52) U.S. Cl. ........................ 303/150; 303/155
(58) Field of Search ................... 303/155, 150

(56) References Cited

U.S. PATENT DOCUMENTS

| 6,027,182 | A | * | 2/2000 | Nakanishi et al. | ........ | 188/356 |
| 6,125,319 | A | * | 9/2000 | Hac et al. | .......... | 303/150 |
| 6,132,014 | A | * | 10/2000 | Kiso et al. | ........ | 303/146 |
| 6,203,121 | B1 | * | 3/2001 | Kato et al. | ........ | 188/181 A |
| 6,266,602 | B1 | * | 7/2001 | Yamaura | ........... | 303/112 |
| 6,308,126 | B2 | * | 10/2001 | Yokoyama et al. | ....... | 180/197 |
| 6,324,461 | B1 | * | 11/2001 | Yamaguchi et al. | ...... | 180/197 |
| 6,443,534 | B2 | * | 9/2002 | Kamiya | ................ | 303/113.5 |
| 6,485,111 | B2 | * | 11/2002 | Suo et al. | ............ | 303/20 |

FOREIGN PATENT DOCUMENTS

| DE | 197 37 779 A1 | 3/1999 | |
| DE | 198 60 044 A1 | 7/1999 | |
| EP | 0887241 A2 * | 12/1998 | ........ B60T/8/00 |
| JP | 6-179361 | 6/1994 | |
| JP | 8-234414 | 12/1996 | |
| JP | 9-263233 | 10/1997 | |
| JP | 10-114263 A | 5/1998 | |
| JP | 10-273022 | 10/1998 | |
| JP | 11-078843 A | 3/1999 | |
| JP | 11-263203 | 9/1999 | |
| JP | 2000-108863 A | 4/2000 | |

* cited by examiner

*Primary Examiner*—Jack Lavinder
*Assistant Examiner*—Benjamin A Pezzlo
(74) *Attorney, Agent, or Firm*—Burns, Doane, Swecker & Mathis, LLP

(57) ABSTRACT

A braking force control device, wherein wheel speed is detected and a slope of a braking force with respect to slip speed of the wheel is estimated on the basis of the detected wheel speed, a braking operation by which a brake pedal is depressed is detected and, on the basis of the detected braking operation conditions and estimated slope of the braking force, braking of the braking device to brake the wheels by a braking force generated in response to the braking operation by which the brake pedal is depressed is assisted.

18 Claims, 11 Drawing Sheets

BRAKING FORCE CONTROL DEVICE

BACKGROUND OF THE INVENTION

1. Field of the Invention

The present invention relates to a braking force control device, disposed in a vehicle, for controlling a braking force in response to operation of a brake pedal.

2. Description of the Related Art

There have conventionally been known braking force control devices that create, on the basis of signals from a wheel speed sensor, speed signals approximating vehicle acceleration or vehicle speed to control braking from a comparison of these and carry out anti-lock braking control (ABS control) to prevent wheel lock. Further, as disclosed in Japanese Patent Application Laid-Open (JP-A) No. 6-179361, for example, when operational speed and the like of a brake pedal exceeds a predetermined threshold, it is judged that rapid braking is required, whereby so-called brake assist control (BA control) is performed to increase braking force with respect to the force at which the brake pedal is depressed.

In order to appropriately operate BA control under various conditions, JP-A No. 9-263233 discloses a braking control device in which initiation criteria of BA control are altered in accordance with brake pedal operation amount, position at which the brake pedal is depressed, stroke, oil pressure of a master cylinder, depression force, depression speed and the like. Further, in JP-A No. 10-273022, there is disclosed a braking control device in which, in order to improve vehicle stability when BA control is operated at the time a vehicle turns, a threshold for initiating BA control is lowered when the turning condition is a condition in which the vehicle is stable and BA control for the rear wheels is not permitted when the vehicle is outside the region of stability.

In a braking force control device that performs ABS control and BA control, BA control is performed on the basis of depressing the brake pedal and the like, and ABS control is performed in response to braking conditions.

However, depending on road surface conditions, sometimes braking initial wheel slip becomes larger due to an increase in oil pressure when BA control is conducted, and the behavior of the vehicle becomes unstable when ABS control is initiated on the basis of the wheel slip.

SUMMARY OF THE INVENTION

The present invention has been devised in view of the above facts. It is an object of the present invention to provide a braking force control device for preventing vehicle behavior from becoming unstable when brake assist control and anti-lock braking control are performed.

In order to accomplish this object, the present invention is a braking force control device comprising: wheel speed detecting means for detecting wheel speed of a wheel; road surface $\mu$ slope estimating means for estimating a slope of the braking force with respect to slip speed of the wheel on the basis of the wheel speed detected by the wheel speed detection means; braking operation detecting means for detecting a braking operation by which a brake pedal is depressed; and assist control means for assisting braking of the wheels by the braking means for braking the wheels by a braking force generated in response to the braking operation by which the brake pedal is depressed, on the basis of the estimation results of the road surface $\mu$ slope estimating means and braking operation conditions detected by the braking operation detecting means.

According to the present invention, assist of braking is conducted in response to braking operation conditions when the brake pedal is depressed. Namely, braking of the wheels is assisted.

Further, assist of braking is conducted on the basis of the road surface $\mu$ slope that the road surface $\mu$ slope estimating means estimates by calculating and the like on the basis of wheel speed detected by the wheel speed detecting means.

Accordingly, appropriate brake assist in response to road surface conditions becomes possible, and it becomes possible to prevent vehicle behavior from becoming unstable and steerability from dropping even if anti-lock brake control is conducted.

In the present invention, it is preferable that the braking operation conditions include a determining means to determine whether or not assist conditions set on the basis of the estimation results of the road surface $\mu$ slope estimating means have been exceeded, and the assist control means assists braking on the basis of determination results of the determining means. In this case, it is further preferable that the assist conditions are lowered when the road surface $\mu$ slope estimated by the road surface $\mu$ slope estimating means is high, and the assist conditions are raised when the road surface $\mu$ slope estimated by the road surface $\mu$ slope estimating means is low.

Further, in the present invention, it is preferable that the device further includes assist amount setting means for setting an assist amount at the time braking of the wheels is assisted on the basis of estimation results of the road surface $\mu$ estimating means, and that the assist control means assists braking at an assist amount set by the assist amount setting means. In this case, it is further preferable that the assist amount is made large when the road surface $\mu$ slope estimated by the road surface $\mu$ slope estimation means is high, and that the assist amount is made small when the road surface $\mu$ slope estimated by the road surface $\mu$ slope estimating means is low.

Moreover, in the present invention, it is preferable that the assist amount setting means corrects the assist force, while braking of the wheels is assisted, on the basis of estimation results of the road surface $\mu$ slope estimating means in order for assist of the braking in response to changes in road surface conditions to become possible.

Still further, in the present invention, it is preferable to set assist conditions of rear wheels to be lower than assist conditions of front wheels and to set an assist amount of rear wheels to be smaller than an assist amount of front wheels, so that braking assist of the rear wheels is suppressed even more than braking assist of the front wheels, whereby stability and steerability of the vehicle are ensured.

In addition, it is preferable that it is possible to assist only braking of the front wheels when an estimation result of the road surface $\mu$ slope estimating means is low.

According to the present invention described above, because brake assist is conducted in response to road surface conditions, excellent effects can be obtained in that brake assist can be prevented from being conducted unnecessarily, and it is possible to ensure stability and steerability of the vehicle while the wheels are appropriately braked.

DESCRIPTION OF THE PREFERRED EMBODIMENTS

A braking force control device pertaining to embodiments of the present invention will hereinafter be described in detail with reference to drawings.

First Embodiment

Figure 1:
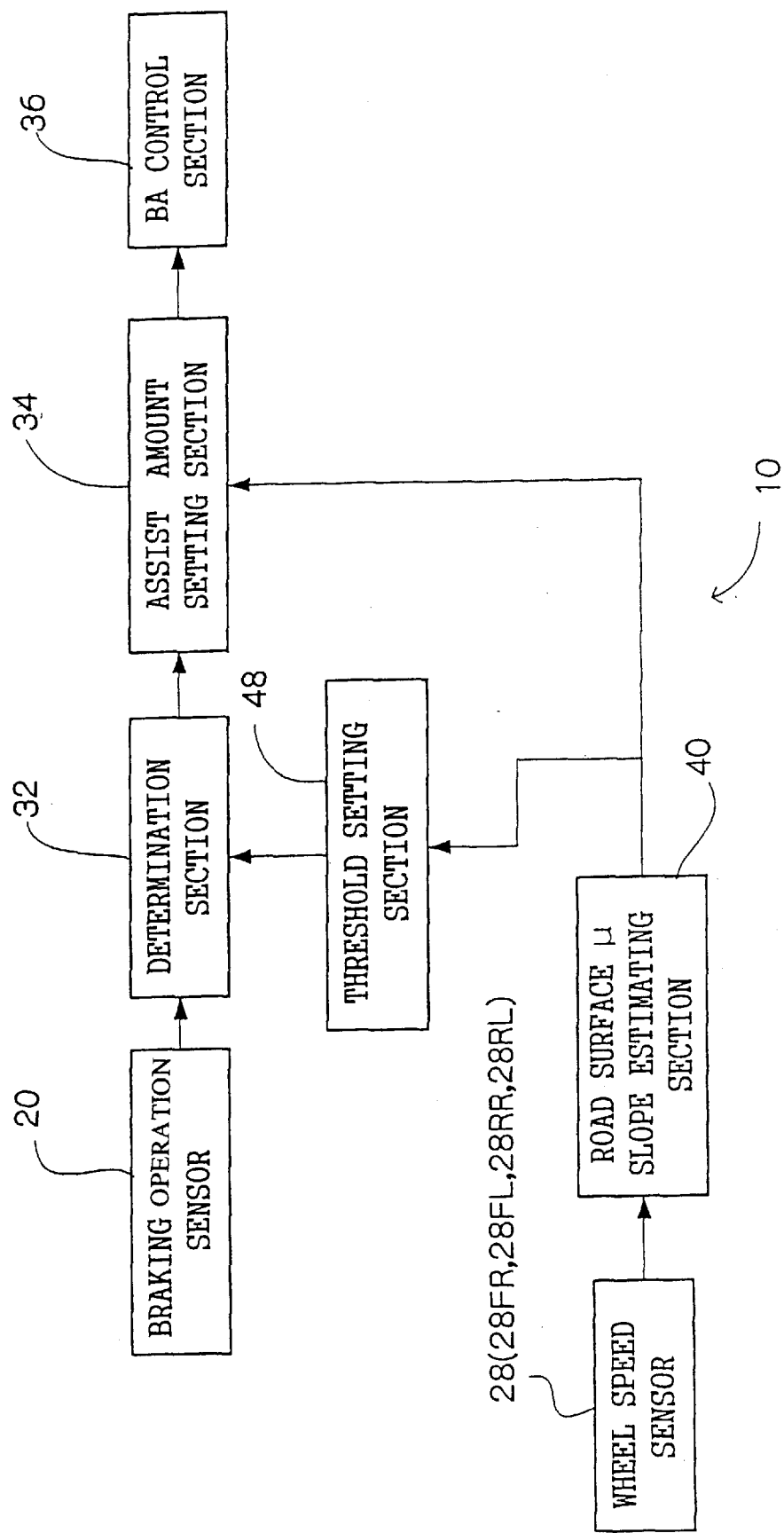
FIG. 1 is a functional block diagram showing a schematic structure of a BA control device to which the present invention is applied.
Figure 2:
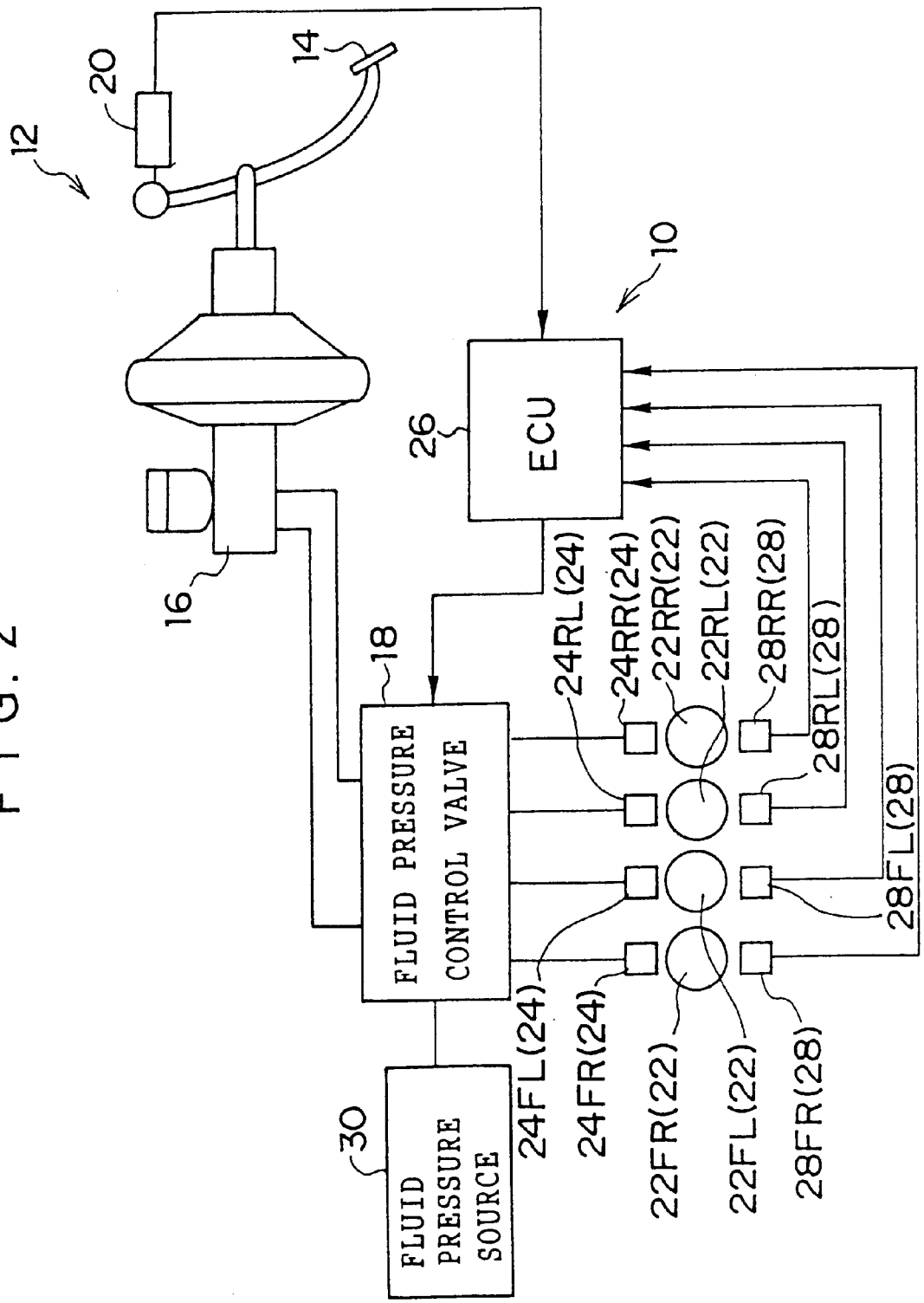
FIG. 2 is a schematic structural diagram of a brake device to which an embodiment of the present invention is applied.

FIG. 1 shows a schematic structure of a brake assist control device (hereinafter referred to as a "BA control device 10") pertaining to an embodiment of the present invention. FIG. 2 shows a schematic structure of a brake system (hereinafter referred to as a "brake device 12") whose operation is controlled by the BA control device 10 in a first embodiment.

In the brake device 12, oil pressure (fluid pressure) rises at a master cylinder 16 by depressing a brake pedal 14, whereby the rise in fluid pressure is transmitted to a fluid pressure control valve 18. Depression of the brake pedal 14 is detected by a braking operation sensor 20.

The fluid pressure control valve 18 is provided with a plurality of valves (e.g., solenoid valves) connected to wheel cylinders 24FR, 24FL, 24RR and 24RL (hereinafter collectively referring to as "wheel cylinders 24") which are respectively disposed at a front right wheel 22FR, a front left wheel 22FL, a rear right wheel 22RR and a rear left wheel 22RL (hereinafter collectively referred to as "wheels 22").

The fluid pressure control valve 18 increases fluid pressure to the wheel cylinders 24 of the respective wheels 22 in response to a rise in fluid pressure transmitted from the master cylinder 16. Each of the wheels 22 is braked by the increase in fluid pressure to the wheel cylinders 24. Hence, fluid pressure corresponding to the fluid pressure supplied from a fluid pressure source 30 is respectively supplied to each of the wheel cylinders 24.

The fluid pressure control valve 18 is connected to an ECU 26 for controlling operation of the braking device 12. Further, wheel speed sensors 28FR, 28FL, 28RR and 28RL (hereinafter collectively referred to as "wheel sensors 28") that are respectively provided at each of the wheels 22 are connected to the ECU 26.

The ECU 26 effects brake assist control (BA control) and anti-lock braking control (ABS control).

Specifically, when controlling the operation of the fluid pressure control valve 18, the ECU 26 ensures stability and steerability of the vehicle at the time of braking by controlling, on the basis of the detection results of the wheel speed sensors 28 and the like, the fluid pressure supplied to each of the wheel cylinders 24 so that the wheels 22 do not lock up. It should be noted in regard to control of the fluid pressure control valve 18 by the ECU 26 that a common structure for effecting ABS control and traction control (TRC) can be suitably used, and that detailed description thereof will be omitted from the present embodiment.

As shown in FIG. 1, the BA control device 10 structured by the ECU 26 is provided with a determination section 32 for determining whether or not BA control is effected. A braking operation sensor 20 for detecting depression of the brake pedal 14 is connected to the determination section 32.

The determination section 32 calculates an amount of braking operation from a position at which the brake pedal is depressed and a change (stroke) or the like in the position at which the brake pedal is depressed detected by the braking operation sensor 20. The determination section 32 then determines a braking operation speed that is an amount of change per unit of time from the amount of braking operation and operation time.

Thereafter, the determination section 32 decides to effect BA control when the calculated braking operation speed exceeds a predetermined threshold. When it is decided to effect BA control, an assist amount setting section 34 sets an assist amount that is an increased amount of fluid pressure at the time BA control is effected. A BA control section 36 executes brake assist by controlling the fluid pressure valve 18 on the basis of the set assist amount.

Figure 3A:
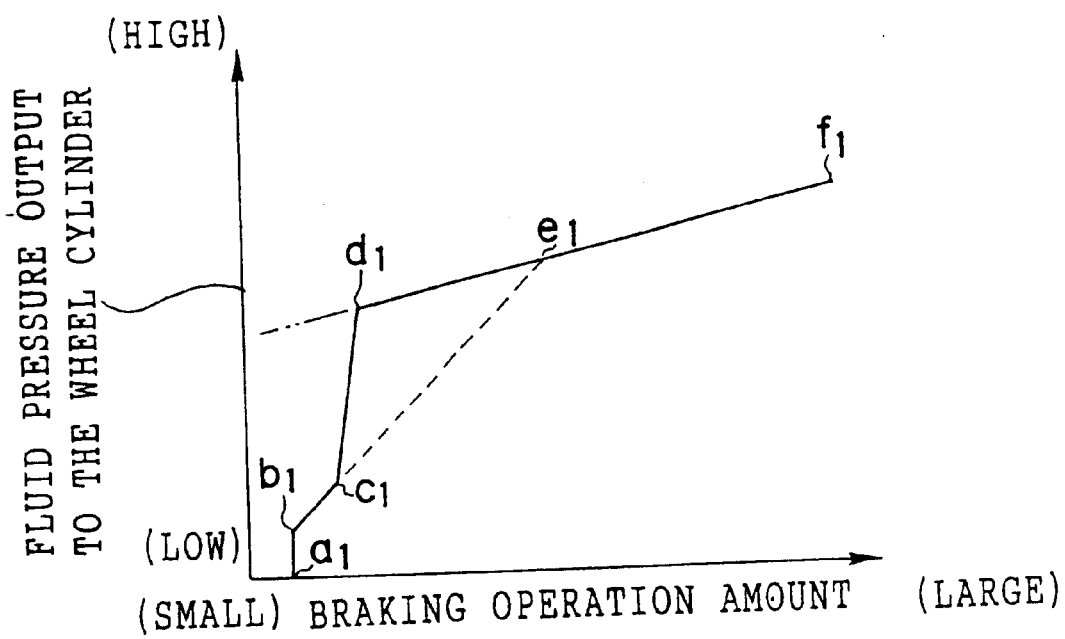
FIGS. 3A and 3B are charts showing an outline of fluid pressure output to a wheel cylinder with respect to an amount of braking control.

Accordingly, as shown in FIG. 3A, when BA control is not effected, fluid pressure to each of the wheel cylinders 24 from the fluid pressure control valve 18 changes from point $a_1$-$b_1$-$c_1$-$e_1$-$f_1$ (a section of which change is indicated by a broken line in FIG. 3A) in response to an increase in the braking operation amount (e.g., amount at which the brake pedal 14 is depressed). By effecting BA control, the fluid pressure output increases from point $c_1$-$d_1$-$e_1$ as shown by a solid line in FIG. 3A. This increase in the fluid pressure output results in an increase in braking force.

Figure 3B:
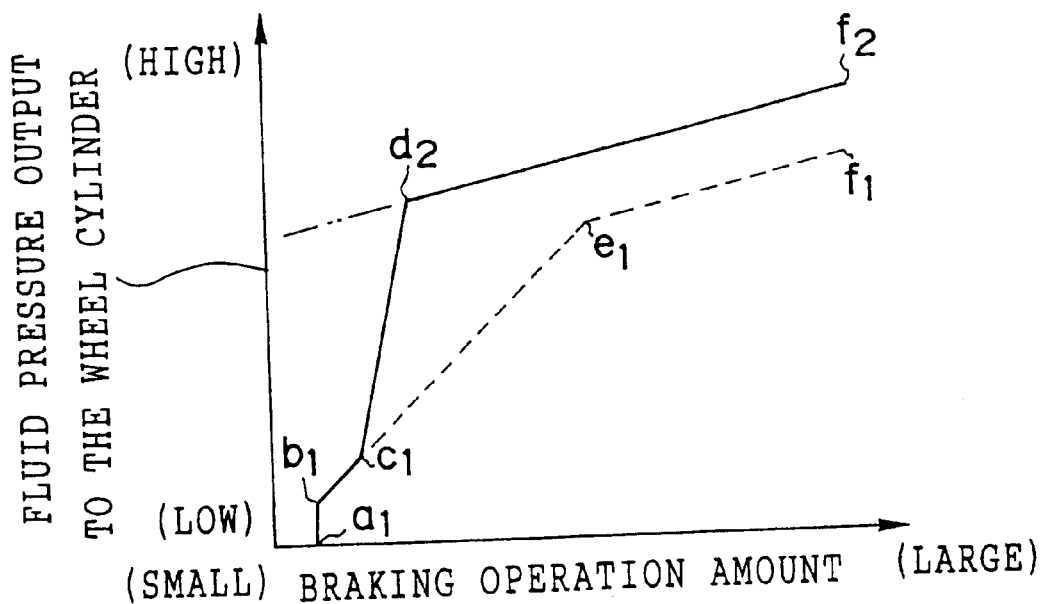

Further, when the fluid pressure supplied to the fluid pressure control valve 18 utilizes a high fluid pressure source 30, by effecting BA control as indicated by a solid line in FIG. 3B, the fluid pressure output changes from point $a_1$-$b_1$-$c_1$-$d_2$-$f_2$ in response to an increase in the braking operation amount. Namely, by effecting BA control, the fluid pressure supplied to the wheel cylinders 24 in response to the fluid pressure that is supplied from the fluid pressure source 30 becomes higher. Accordingly, a high braking force can be obtained even if the braking operation amount of the brake pedal 14 is slight. It should be noted that, in FIG. 3, a portion of the fluid pressure output to the wheel cylinders 24 at the time BA control is not effected is indicated by a dotted line.

The BA control device 10 is disposed with a road surface $\mu$ slope estimating section 40. Wheel speed sensors 28 provided at each of the wheels 22 are connected to the road surface $\mu$ slope estimating section 40.

Figure 4:
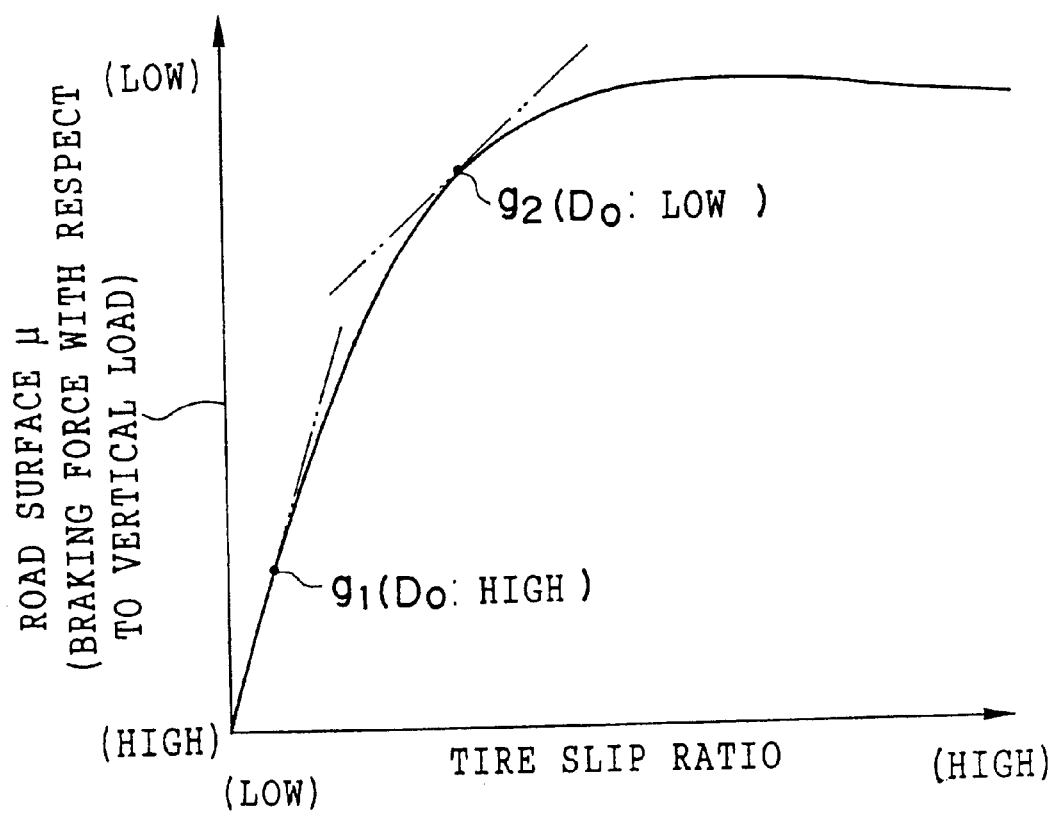
FIG. 4 is a chart showing an outline of change in a road surface $\mu$ with respect to tire slip ratio.

A friction coefficient $\mu$ between the wheels and a road surface (road surface $\mu$) is a value in which the braking force is divided by a vertical load (braking force with respect to a vertical load). As shown in FIG. 4, a road surface $\mu$ slope $D_o$ is defined by the road surface $\mu$ with respect to a tire slip ratio of the wheels 22 contacting the road surface.

That is, when tire grip force is high (i.e., when braking force with respect to vertical load is small, as indicated by point $g_1$ in FIG. 4), the tire slip ratio is low. In a state in which the tire slip ratio is low, the road surface $\mu$ slope $D_o$ becomes high. In contrast, when tire grip force is low (i.e., when braking force with respect to vertical load is large, as indicated by point $g_2$ in FIG. 4), the tire slip ratio is high. In a state in which the tire slip ratio is high, the road surface $\mu$ slope $D_o$ becomes low, and in a state in which the tire slip is generated at a braking force peak, the value of road surface $\mu$ slope $D_o$ becomes zero ("$D_o=0$").

In this manner, the road surface $\mu$ slope $D_o$ becomes an index showing the grip level of the tires contacting the road surface.

Figure 5:
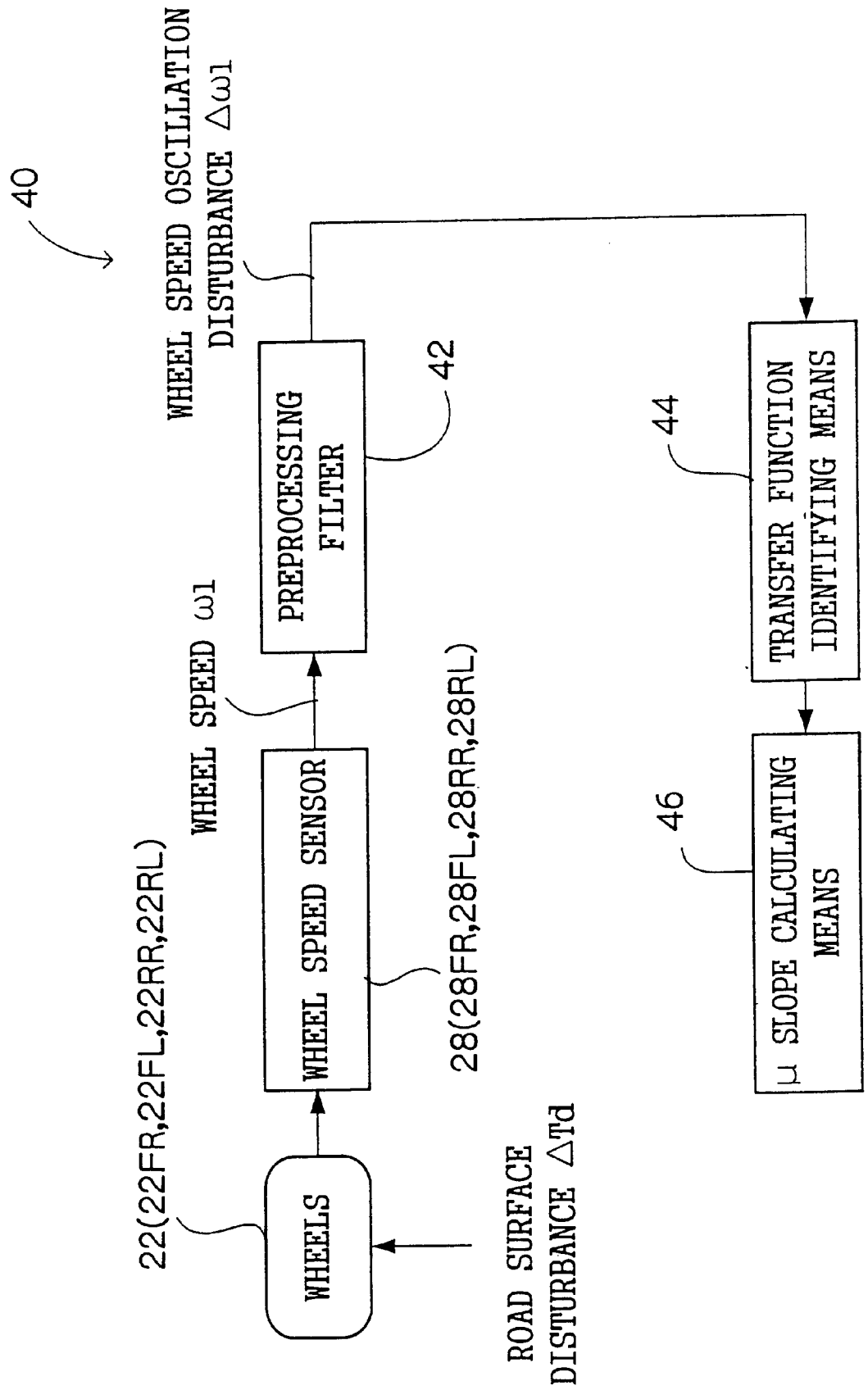
FIG. 5 is a functional block diagram showing a schematic structure of a road surface $\mu$ slope estimation section.

As shown in FIG. 5, the road surface $\mu$ slope estimating section 40 is structured by a preprocessing filter 42, a transfer function identifying means 44 and $\mu$ slope calculating means 46. When only a road surface disturbance $\Delta Td$ is inputted as excited input to a wheel resonance system, the road surface $\mu$ slope is estimated by calculating the road surface $\mu$ slope $D_o$.

The wheel speed sensors 28 detect a wheel speed $\omega_1$ for each of the wheels 22. The preprocessing filter 42 detects a wheel speed oscillation $\Delta\omega_1$ of each of the wheels 22 as responded output of the wheel resonance system that receives the road surface disturbance $\Delta Td$ from the outputted wheel speed $\omega_1$ for each of the wheels 22. The transfer function identifying means 44 uses a least squares method to identify a transfer function of each wheel that satisfies the detected wheel speed oscillation $\Delta\omega_1$. Further, the $\mu$ slope calculating means 46 calculates for each of the wheels 22 the slope of the friction coefficient $\mu$ between the tires and the road surface on the basis of the identified transfer function.

Using a frequency that is predicted to be a resonance frequency of the wheel resonance system, the preprocessing filter 42 can be structured by a band-path filter through which only a constant band frequency component passes, a high-path filter through which only a high band frequency component including the corresponding resonance frequency component passes, and the like. The parameters governing frequency characteristics of the band-path filter or the high-path filter are fixed at a constant value. It should be noted that an output of the preprocessing filter 42 is a value from which the DC component has been removed, and extracts only the wheel speed oscillation $\Delta\omega_1$ around the wheel speed $\omega_1$.

Here, the transfer function F(s) of the preprocessing filter 42 is:

$$F(s) = \frac{1}{\sum_{i=0}^{m} c_i s^{m-1}} \tag{1}$$

wherein $c_i$ is a coefficient of the filter transfer function, and s is a Laplacean.

Next, the computational formula on which the transfer function identifying means 44 depends will be derived. Note that in the present embodiment, computation (calculation) of the preprocessing filter 42 is carried out within the computation of the transfer function identifying means 44.

First, the transfer function which is to be identified is two-dimensionally modeled by using the road surface disturbance $\Delta Td$ as the excitation input, and the wheel speed oscillation $\Delta\omega_1$ detected by the preprocessing filter 42 at this time as the response output. Namely, the following vibration model is assumed.

$$\Delta\omega_1 = \frac{b_2}{\sum_{i=0}^{2} a_i s^{2-i}} \Delta T_d + v, \; a_0 = 1 \tag{2}$$

Here, v is the observed noise which is included at the time of observing the vehicle speed signal. By modifying formula (2), the following formula is obtained.

$$\sum_{i=0}^{2} a_i s^{2-i} \Delta\omega_1 = b_2 \Delta T_d + \sum_{i=0}^{2} a_i s^{2-i} v \tag{3}$$

First, the formula obtained by applying the preprocessing filter 42 of formula (1) to formula (3) is digitized. At this time, wheel speed oscillation $\Delta\omega 1$, road surface disturbance $\Delta Td$, and wheel speed signals v are expressed as digitized data $\Delta\omega 1(k)$, $\Delta Td(k)$, and $v(k)$ (k is a sampling number; k=1, 2, 3, ...) which are sampled for each sampling cycle Ts. Further, the Laplacean s can be digitized by using a predetermined digitizing method. In the present embodiment, as one example, digitization is carried out by using the following bilinear conversion. Note that d is a one sample delay operator.

$$s = \frac{2}{T_S} \cdot \frac{1-d}{1+d}$$

Further, the degree m of the preprocessing filter 42 is preferably 2 or more. Thus, in the present embodiment, in consideration of the computation time, m=2, and the following formula is thereby obtained.

$$\sum_{i=0}^{2} a_i \xi_{yi}(k) = b_2 \xi_{u2}(k) + \sum_{i=0}^{2} a_i \xi_{vi}(k) \tag{4}$$

wherein $$\xi_{yi}(k) = \left(\frac{T_S}{2}\right)^i (1+d)^i (1-d)^{2-i} F_0(d) \Delta\omega_1(k) \tag{5}$$

$$\xi_{u2}(k) = \left(\frac{T_S}{2}\right)^i (1+d)^2 F_0(d) \Delta T_d(k) \tag{6}$$

$$\xi_{vi}(k) = \left(\frac{T_S}{2}\right)^i (1+d)^i (1+d)^{2-i} F_0(d) v(k) \tag{7}$$

$$F_0(d) = \frac{1}{\sum_{i=0}^{2} c_i \left(\frac{T_S}{2}\right)^i (1+d)^i (1-d)^{2-i}} \tag{8}$$

Further, in order to identify the transfer function from the respective data of the wheel speed oscillation $\Delta\omega 1$, formula (4) is converted, on the basis of the least squares method, into the following formula so as to become a linear function with respect to the parameter which is to be identified. Note that "T" transposes a matrix.

$$\xi_{yo}(k) = \zeta^T(k)\theta + r(k) \tag{9}$$

Here, $$\zeta(k) = [-\xi_{y1}(k) - \xi_{y2}(k)]^T \quad (10)$$

$$\theta = [a_1 a_2]^T$$

$$r(k) = b_2 \xi_{u2}(k) + \sum_{i=0}^{2} a_i \xi_{vi}(k)$$

In the above formulas, θ is a parameter of the transfer function to be identified.

At the road surface μ slope estimating section 40, by applying the least squares method, the unknown parameter θ is estimated for the respective data which successively apply the digitized data of the detected wheel speed oscillation Δω1 detected by the transfer function identifying means 44 to formula (9). In this way, the transfer function is identified.

Specifically, the detected wheel speed oscillation Δω1 is converted into digitized data Δω(k) (k=1, 2, 3, . . . ). The data are N point sampled, and by using the following least squares method computational formula, the parameter θ of the transfer function is estimated.

$$\hat{\theta}(N) = \left[\sum_{k=1}^{N} \rho^{N-k} \zeta(k) \zeta^T(k)\right]^{-1} \left[\sum_{k=1}^{N} \rho^{N-k} \zeta(k) \xi_{yo}(k)\right] \quad (11)$$

Here, the value capped by the carat mark (i.e., the ^mark) is defined as being an estimated value.

Further, the least squares method may carry out computation as a successive type least squares method which determines the parameter θ by the following recurrence formula.

$$\hat{\theta}(N) = \hat{\theta}(N-1) + h(N)\left[\xi_{yo}(N) - \zeta^T(N)\hat{\theta}(N-1)\right] \quad (12)$$

$$h(N) = \frac{P(N-1)\zeta(N)}{\rho + \zeta^T(N)P(N-1)\zeta(N)} \quad (13)$$

$$P(N) = \frac{1}{\rho}\{I - h(N)\zeta^T(N)\}P(N-1) \quad (14)$$

Here, ρ is a so-called forgetting coefficient, and is usually set to a value of 0.95 to 0.99. At this time, the initial value may be:

$$\hat{\theta}(-1)=0, P(-1)=aI$$

wherein a is a sufficiently large positive number.

Further, as a method for reducing the estimation error of the least squares method, any of various correction least squares methods may be used. In the present embodiment, an example will be described which uses an auxiliary variable method, which is a least squares method into which an auxiliary variable is introduced. In accordance with this method, at the stage when the relation of formula (9) is obtained, the parameter of the transfer function is estimated by using the following formula, by using m(k) as the auxiliary variable.

$$\hat{\theta}(N) = \left[\sum_{k=1}^{N} \rho^{N-k} m(k) \zeta^T(k)\right]^{-1} \left[\sum_{k=1}^{N} \rho^{N-k} m(k) \xi_{yo}(k)\right] \quad (15)$$

Further, successive computation is carried out as follows.

$$\hat{\theta}(N)=\hat{\theta}(N-1)+h(N)[\xi_{yo}(N)-\zeta^T(N)\hat{\theta}(N-1)] \quad (16)$$

$$h(N) = \frac{P(N-1)m(N)}{\rho + \zeta^T(N)P(N-1)m(N)} \quad (17)$$

$$P(N) = \frac{1}{\rho}\{I - h(N)\zeta^T(N)\}P(N-1) \quad (18)$$

The principles of the auxiliary variable method are as follows. By substituting formula (9) into formula (15), the following formula is obtained.

$$\hat{\theta}(N) = \theta + \left[\sum_{k=1}^{N} \rho^{N-k} m(k) \zeta^T(k)\right]^{-1} \left[\sum_{k=1}^{N} \rho^{N-k} m(k) r(k)\right] \quad (19)$$

Thus, if the auxiliary variable is selected such that the second term at the right side of formula (19) becomes zero, the estimated value of θ matches the actual value of θ. Thus, in the present embodiment, as the auxiliary variable, a variable is used which is delayed to the extent that ζ(k)=[−ξy1(k)−ξy2(k)]$^T$ is not correlated with the formula error r(k). Namely, $$m(k)=[\zeta_{y1}(k-L)-\zeta_{y2}(k-L)]^T \quad (20)$$

wherein L is the delay time.

After the transfer function is identified as described above, at the μ slope calculating means 46, a physical amount which relates to the μ slope $D_o$ is computed as:

$$\frac{\hat{a}_2}{\hat{a}_1} = \frac{D_0}{J_1 + J_2} \quad (21)$$

In this way, when a physical amount relating to the road surface μ slope $D_o$ can be computed from formula (21), it can easily be judged that the friction characteristic between the tire and the road surface is in a saturated state, for example, when the physical amount is small.

The above-described road surface slope estimating means is a structure in which a parameter, which stipulates the frequency characteristic of the bandpass filter or the bypass filter, is fixed to a constant value at the preprocessing filter 42. However, this parameter may be varied in accordance with the parameter identified at the transfer function identifying means 44. Namely, an adaptation means, which varies the characteristic of the preprocessing filter 42 in accordance with the parameter identified at the transfer function identifying means 44, may be additionally provided (as in the second aspect of the first embodiment of JP-A No. 11-78843 (refer to FIG. 9 and the like)).

Further, in a case in which an excitation torque ΔT1 is inputted to the wheel resonance system as an excitation input, the road surface μ slope estimating section 40 may identify the transfer function of the wheel resonance system and compute the road surface μ slope (as in the first aspect of the third embodiment of JP-A No. 11-78843 (refer to FIG. 13 and the like)).

Moreover, in a case in which an excitation torque ΔT1 is inputted to the wheel resonance system as an excitation input, the road surface μ slope estimating section 40 may identify the transfer function of the wheel resonance system from the detected excitation input and response output (as in the first aspect of the fourth embodiment of JP-A No. 11-78843 (refer to FIG. 16 and the like)).

In addition, the road surface μ slope estimating section 40 may select, from among the response outputs, only the response output which is a periodic signal, and identify the transfer function of the wheel resonance system on the basis of the selected response output, and compute the $\mu$ slope (as in the fifth embodiment of JP-A No. 11-78843 (refer to FIG. 18 and the like)).

In the above-described examples, the output response for the excitation input to the wheel resonance system including the friction characteristic between the tire and the road surface is detected. The transfer characteristic of the wheel resonance system from the excitation input to the response output is expressed as a vibration model which includes, as the unknown factor of the wheel state, at least a physical amount relating to the ease of slippage between the tire and the road surface. On the basis of the vibration model, the unknown factor is estimated such that at least the detected response output is substantially satisfied.

The present invention is not limited to the same, and the following is possible. A parameter of a physical model that expresses an unsprung resonance characteristic is identified from the wheel speed signal. The road surface $\mu$ slope is computed as a physical amount which estimates a physical amount relating to the ease of slippage between the road surface and tires of the wheels 22 from the identified parameter (refer to the description of the embodiments in Japanese Patent Application No. 10-281660).

Moreover, the road surface $\mu$ slope is computed as the physical amount relating to the ease of slippage between the road surface and the wheel. However, the present invention is not limited to the same. A slope of braking torque with respect to slip speed (i.e., a braking torque slope), a slope of driving torque with respect to slip speed (i.e., a driving torque slope), a minute vibration, or the like may be determined.

Namely, the braking torque slope or the driving torque slope may be computed on the basis of time series data of wheel speed which is detected each time a predetermined sampling time elapses (refer to FIG. 1 and the like of JP-A No. 10-114263).

Further, the braking torque slope may be computed on the basis of time series data of wheel deceleration which is detected each time a predetermined sampling time elapses, and on the basis of the braking torque detected each time a predetermined sampling time elapses or time series data of a physical amount which relates to this braking torque (refer to FIGS. 2, 3 and the like of JP-A No. 10-114263).

Further, the braking force may be minutely excited at the resonance frequency of a vibration system formed from the vehicle and the wheels 22 including the tires and the road surface, and a minute gain, which is the ratio of the extremely small amplitude of the resonance frequency component of the wheel speed with respect to the minute amplitude of the braking force at the time the braking force is minutely excited, may be computed (see FIG. 4 and the like of JP-A No. 10-114263).

The road surface $\mu$ slope $D_o$ estimated by the road surface $\mu$ slope estimating section 40 is inputted to the assist setting section 48 and the braking amount setting section 34.

Figure 6:
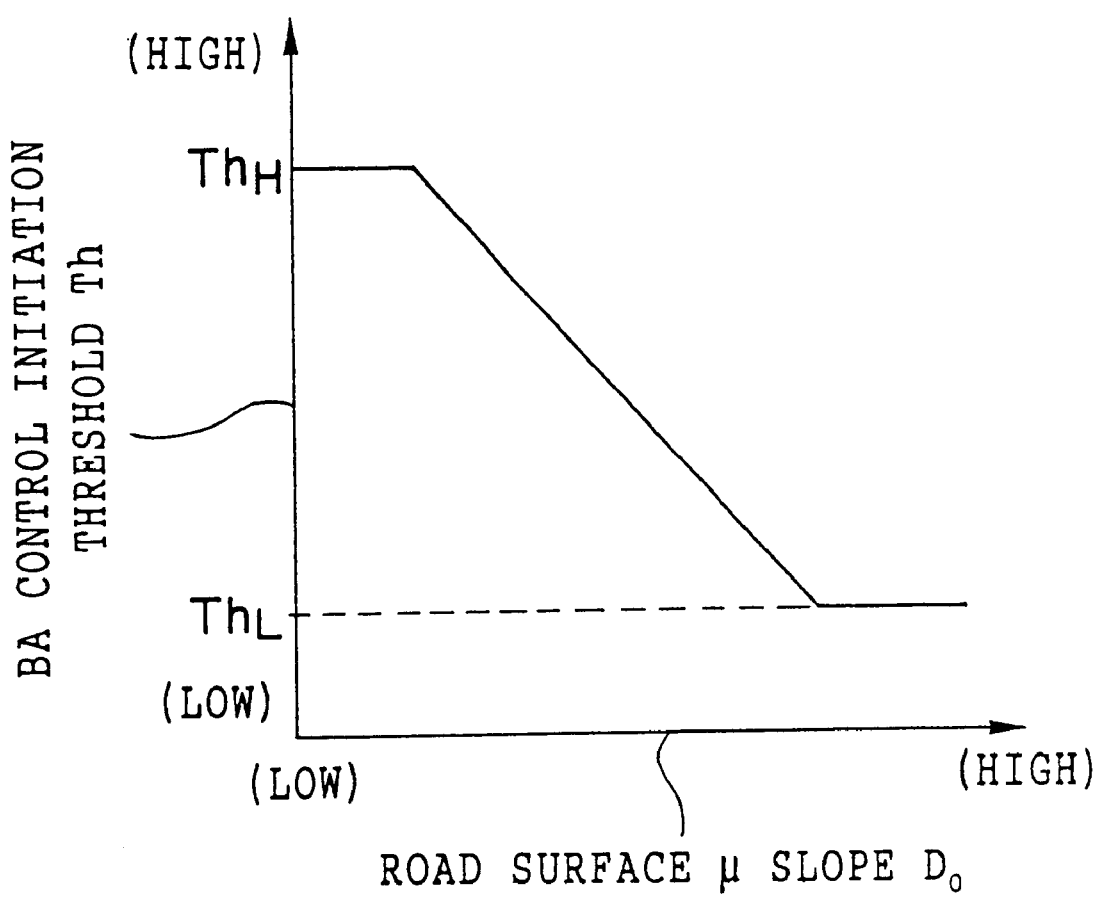
FIG. 6 is a chart showing an outline of a threshold that is set on the basis of the road surface $\mu$ slope in a first embodiment of the present invention.

At the threshold setting section 48, the threshold Th at the time it is determined at the determination section 48 whether or not BA control will be effected after the braking operation speed is calculated from the braking operation amount is set on the basis of the road surface $\mu$ slope $D_o$ inputted from the road surface $\mu$ slope estimating section 40. As shown in FIG. 6, at the threshold setting section 48, when the road surface $\mu$ slope $D_o$ is low, the threshold Th is set high, and when the road surface $\mu$ slope $D_o$ is high, the threshold Th is set low.

It should be noted in regard to the threshold Th that an upper limit $Th_H$ and a lower limit $Th_L$ are set, and the threshold Th is set between the upper limit $Th_H$ and the lower limit $Th_L$ ($Th_H \geq Th \geq Th_L$).

The determination section 32 decides whether or not to effect BA control on the basis of whether or not the braking operation speed X calculated from the braking operation amount and the like exceeds the threshold Th. Even if the braking operation speed X is the same, the determination section 32 decides to effect BA control when the road surface $\mu$ slope $D_o$ is high. However, when the road surface $\mu$ slope $D_o$ is low, the determination section 32 decides either not to effect BA control or to stop BA control.

Figure 7:
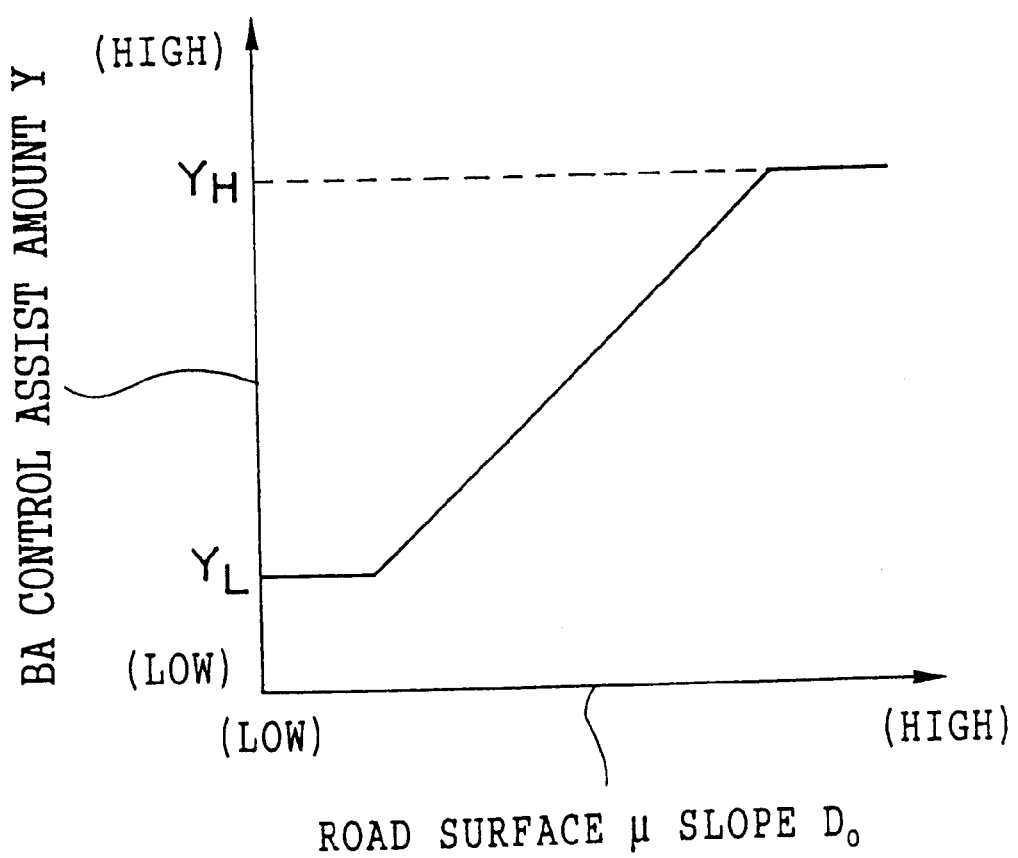
FIG. 7 is a chart showing an outline of an assist amount that is set on the basis of the road surface $\mu$ slope in the first embodiment of the present invention.

Further, at the assist amount setting section 34, an assist amount Y at the time BA control is effected is set on the basis of the road surface $\mu$ slope $D_o$. As shown in FIG. 7, when the road surface $\mu$ slope $D_o$ is low, the assist amount Y is set to become low, and when the road surface $\mu$ slope $D_o$ is high, the assist amount is set to become high. It should be noted in regard to the assist amount Y that an upper limit $Y_H$ and a lower limit $Y_L$ are set, and the assist amount Y is set on the basis of the road surface $\mu$ slope $D_o$ to be between the upper limit $Y_H$ and the lower limit $Y_L$ ($Y_H \geq Y \geq Y_L$)

It should also be noted in regard to the threshold Th and the assist amount Y that it is permissible for standard values thereof to be preset so that the standard values of the threshold Th and the assist amount Y are corrected on the basis of the road surface $\mu$ slope $D_o$ at the threshold setting section 48 and the assist amount setting section 34.

Operation of the BA control device 10 structured in this manner will now be described with reference to the flowchart in FIG. 8. It should be noted in regard to the BA control device 10 that the routine represented by the flowchart is executed by an ignition switch (not shown) being turned ON in order to initiate running of the vehicle, and execution of the same routine is concluded by the ignition switch being turned OFF.

Figure 8:
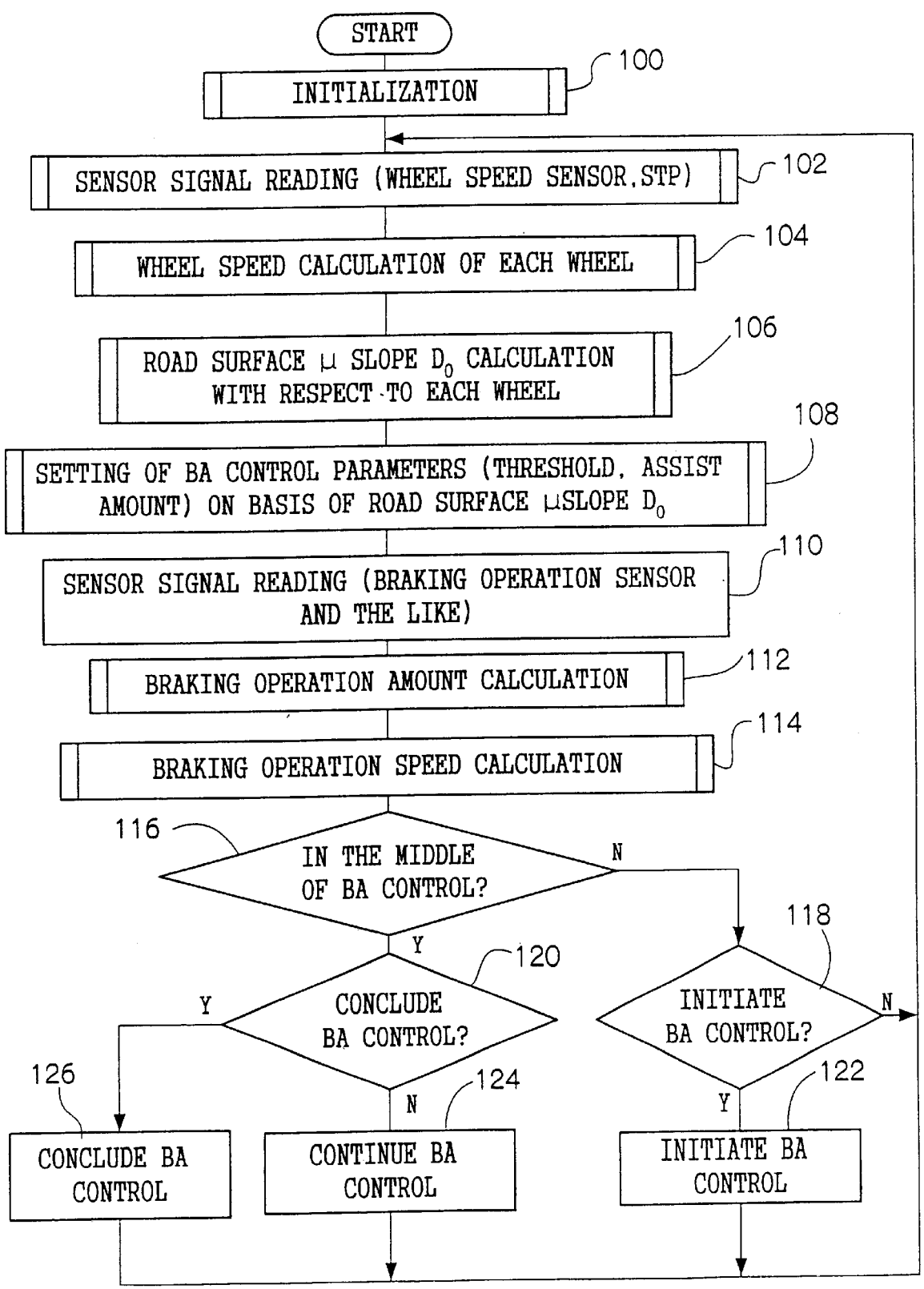
FIG. 8 is a flowchart showing an outline of BA control pertaining to an embodiment of the present invention.

In the flowchart shown in FIG. 8, initialization of various parameters is conducted in step 100 by the ignition switch being turned ON. Thereafter, in step 102, sensor signals are read that are detected by respective signals of the wheel speed sensors 28 provided at the wheels 22 and a stop switch (STP, not shown in the drawings) for detecting whether or not the brake pedal 14 is being operated.

In step 104, the wheel speed $\omega_1$ of each of the wheels 22 detected by the respective wheel speed sensors 28 is calculated. Next, in step 106, the road surface $\mu$ slope $D_o$ is estimated. The road surface $\mu$ slope $D_o$ extracts the wheel speed oscillation $\Delta\omega_1$ from the wheel speed $\omega_1$ of each of the wheels 22, and calculates the road surface $\mu$ slope $D_o$ for each of the wheels 22 on the basis of the wheel speed oscillation $\Delta\omega_1$.

Thereafter, in step 108, BA control parameters such as the threshold Th, the assist amount Y and the like are set on the basis of the road surface $\mu$ slope $D_o$.

In step 110, sensor signals for deciding whether or not to effect BA control, such as the braking operation sensor 20, are read.

Here, when the brake pedal 14 is depressed to brake the vehicle, depression of the brake pedal 14 and status of the depression are detected by the braking operation sensor 20 and read.

Next, in step 112, braking operation amount is calculated on the basis of the position at which the brake pedal is depressed and a change (stroke) in that position detected by the braking operation sensor 20 and the like. In step 114, braking operation speed X is calculated from the braking operation amount. It should be noted that setting the BA control parameters based on estimation (calculation) of the road surface $\mu$ slope $D_o$ and estimation results in steps 102–108 and calculation of the braking operation speed X in steps 110–114 may be conducted in parallel.

In this manner, when calculation to estimate the road surface $\mu$ slope $D_o$ and setting the BA control parameters based on the road surface $\mu$ slope $D_o$ are concluded, it is decided whether or not to effect BA control on the basis of the BA control parameters and the braking operation speed X in steps 116–120.

In step 116, it is confirmed whether or not BA control is being executed, and when it is confirmed that BA control is not being effected (a negation in step 116), the routine proceeds to step 118 to decided whether or not to effect BA control.

The decision of whether or not to effect BA control is conducted by comparing the braking operation speed X with the threshold Th set as one BA control parameter on the basis of the road surface $\mu$ slope $D_o$. The decision is conducted for each of the wheels 22FR, 22FL, 22RR and 22RL.

Here, when the braking operation speed X has not reached the threshold Th (X≦Th, a negation in step 118), the routine returns to step 102 without setting to effect BA control.

In contrast, when the braking operation speed X exceeds the threshold Th (X≧Th, an affirmation in step 118), the routine proceeds to step 122, and BA control is set to be effected by the assist force Y set on the basis of the road surface $\mu$ slope $D_o$ as a BA control parameter (BA control initiation).

In this manner, the threshold that is set on the basis of the road surface $\mu$ slope $D_o$ is taken as a criterion and whether or not to effect BA control is decided. Thus, slipping of the wheels 22 after ABS control is initiated after a large braking force is applied in a state in which the road surface $\mu$ is low, so that the vehicle loses stability and steerability drops, can be reliably prevented.

Further, by setting the assist amount Y on the basis of the road surface $\mu$ slope $D_o$ at the time BA control is effected, a braking force larger than necessary can be prevented from being applied to the wheels 22 in a state in which the road surface $\mu$ is low, whereby safe braking of the vehicle can be carried out.

In particular, braking operation can be easily conducted by the ABS control or the like when the road surface $\mu$ slope $D_o$ is low, because tire grip is already low and it is needless to effect BA control.

Accordingly, when the road surface $\mu$ slope $D_o$ is low, by setting the threshold Th to be high so that it becomes difficult for BA control to be effected and suppressing an increase in the braking force by lowering the assist power Y even then effecting BA control, it is possible to reliably prevent a large braking force from working as a result of the BA control being unnecessarily effected.

Further, in a case in which the road surface $\mu$ slope $D_o$ is low, when the tire grip becomes high, by raising the assist force Y, BA control can be conducted effectively so that a precise braking force can be applied to the vehicle.

When step 116 is executed by BA control being initiated in this manner, an affirmation is made in step 116 and the routine proceeds to step 120. In step 120, it is determined whether or not the braking operation speed X has exceeded the threshold from the threshold Th that is set on the basis of the latest road surface $\mu$ slope $D_o$ and braking operation speed X. When the braking operation speed X has exceeded the threshold (X≧Th, an affirmation in step 120), the routine proceeds to step 122 to continue BA control. At this time, the assist amount Y that is set on the basis of the latest road surface $\mu$ slope $D_o$ is used.

In contrast, when the braking operation speed X has not reached the threshold Th (X<Th), a negation is made in step 120 and the routine proceeds to step 126 to conclude BA control.

Namely, while BA control is being continued, the decision of whether or not to effect BA control utilizes an assist amount Y at the time BA control is effected, with the assist amount Y used being that which is set on the basis of the latest road surface $\mu$ slope $D_o$.

Accordingly, BA control can be precisely effected in accordance with changes in the road surface $\mu$ while the vehicle is running. While BA control is effected, stability and steerability of the vehicle can be ensured even when ABS control has been initiated.

Second Embodiment

A second embodiment of the present invention will now be described. It should be noted that the structure of invention according to the second embodiment is essentially the same as that of the first embodiment. Parts shared in common with those described in the first embodiment will be designated by the same reference numerals and description thereof omitted.

In the second embodiment, setting criteria of the assist amount Y and the threshold Th set on the basis of the road surface $\mu$ slope $D_o$ determined with respect to each of the wheels 22 are altered for the front wheels 22FR and 22FL and the rear wheels 22RR and 22 RL.

Figure 9:
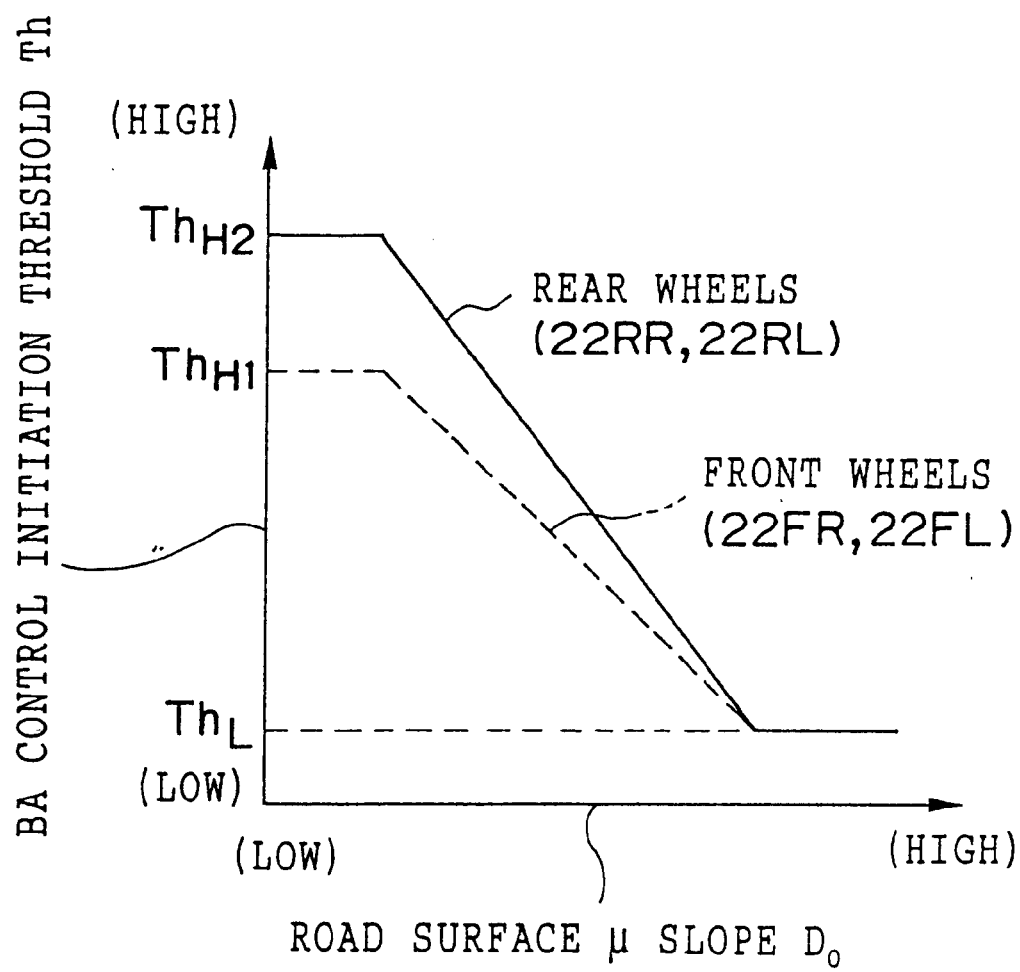
FIG. 9 is a chart showing an outline of a threshold to be set on the basis of a road surface $\mu$ slope in a second embodiment of the present invention.

That is, in the threshold setting section 48, as shown in FIG. 9, if the road surface $\mu$ slope $D_o$ is the same, a threshold Th of the rear wheels (wheels 22RR and 22RL) is set to be higher than a threshold Th of the front wheels (wheels 22Fr and 22FL).

In this case, an upper limit $Th_{H1}$ of the threshold Th with respect to the front wheels 22FR and 22FL becomes lower than an upper limit $Th_{12}$ of the threshold Th with respect to the rear wheels 22RR and 22RL ($Th_{H1}<Th_{H2}$). With respect to the front wheels 22FR and 22FL, a threshold Th is set between a lower limit $Th_L$ and an upper limit $Th_{H1}$ ($Th_{H1}≧Th≧Th_L$). With respect to the rear wheels 22RR and 22RL, a threshold Th is set between the lower limit $Th_L$ and an upper limit $Th_{H2}$ ($Th_{H2}≧Th≧Th_L$).

Figure 10:
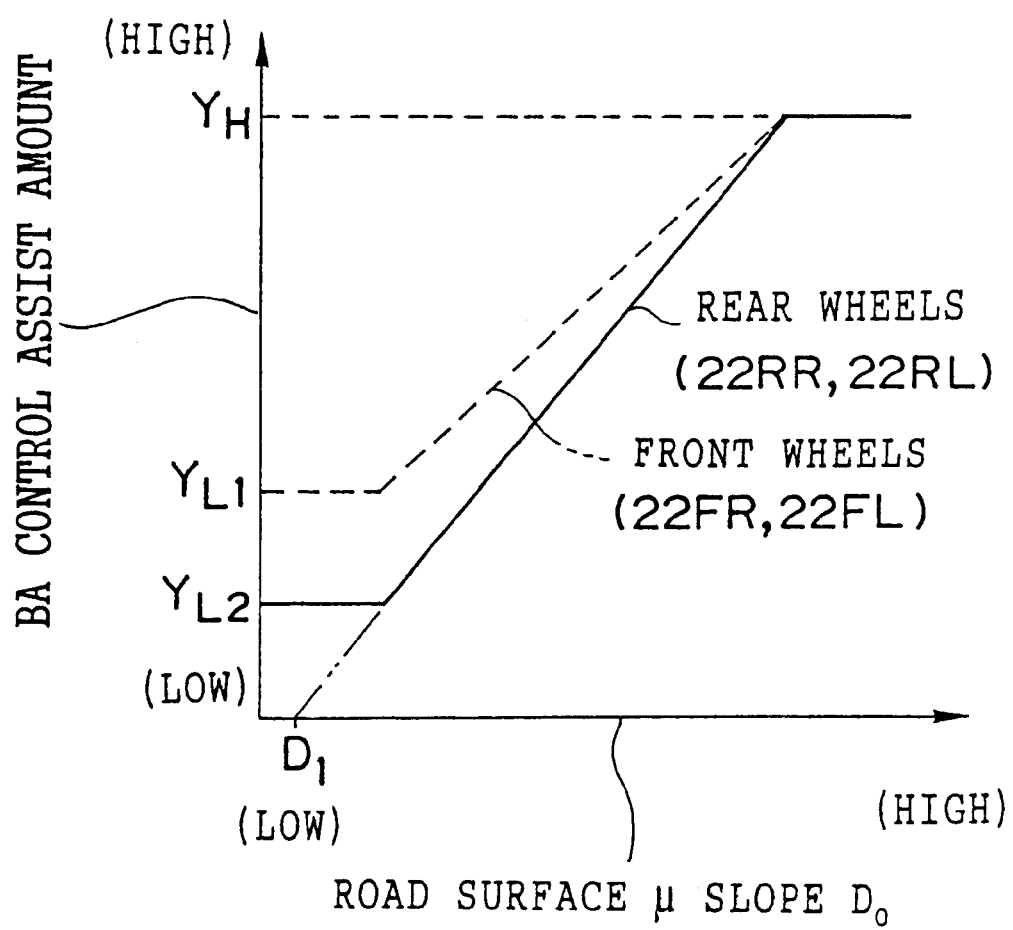
FIG. 10 is a chart showing an outline of an assist amount that is set on the basis of the road surface $\mu$ slope in the second embodiment of the present invention.

Further, in the assist amount setting section 34, as shown in FIG. 10, if the road surface $\mu$ slope $D_o$, an assist amount Y of the rear wheels (wheels 22RR and 22RL) is set to be lower than an assist amount Y of the front wheels (wheels 22FR and 22FL).

In this case, a lower limit $Y_{L2}$ of the assist amount Y with respect to the rear wheels 22RR and 22RL is set to be lower than a lower limit $Y_{L1}$ of the assist amount Y with respect to the front wheels 22FR and 22FL.

Accordingly, in the second embodiment, BA control of the rear wheels 22RR and 22RL can be controlled, and the assist amount Y can be made lower than the front wheels 22FR and 22FL when BA control is effected.

When the vehicle is braked, a vertical load with respect to the front wheels 22FR and 22FL is raised, while a vertical load with respect to the rear wheels 22RR and 22RL is lowered. Accordingly, the road surface $\mu$ slope $D_o$ changes.

At this time, by setting the threshold Th with respect to the rear wheels 22RR and 22RL to be high and setting the assist amount Y to be low, precise BA control to correspond to changes in the road surface $\mu$ slope $D_o$ becomes possible.

In particular, while the vehicle is making a wide turn, a decline in the vertical load with respect to the rear wheels 22RR and 22RL changes the steerability of the vehicle at the oversteer side. However, it becomes possible to ensure safe steerability in which such changes in steerability are suppressed.

It should be noted in regard to the assist amount Y with respect to the rear wheels 22RR and 22RL that the lower limit may be set to zero ($Y_{L2}=0$) as shown by a two-dot line in FIG. 10. That is, when the road surface $\mu$ slope $D_o$ is equal to or less than a predetermined value $D_1$, it becomes possible to effect BA control only on the front wheels 22FR and 22FL without effecting BA control on the rear wheels 22RR and 22RL.

It should be noted that the present invention is not limited to the foregoing embodiments. For example, although description has been given in the above embodiments of the braking device 12 disposed with the fluid pressure source 30, the invention may be disposed with a vacuum source in place of the fluid pressure source 30.

Figure 11:
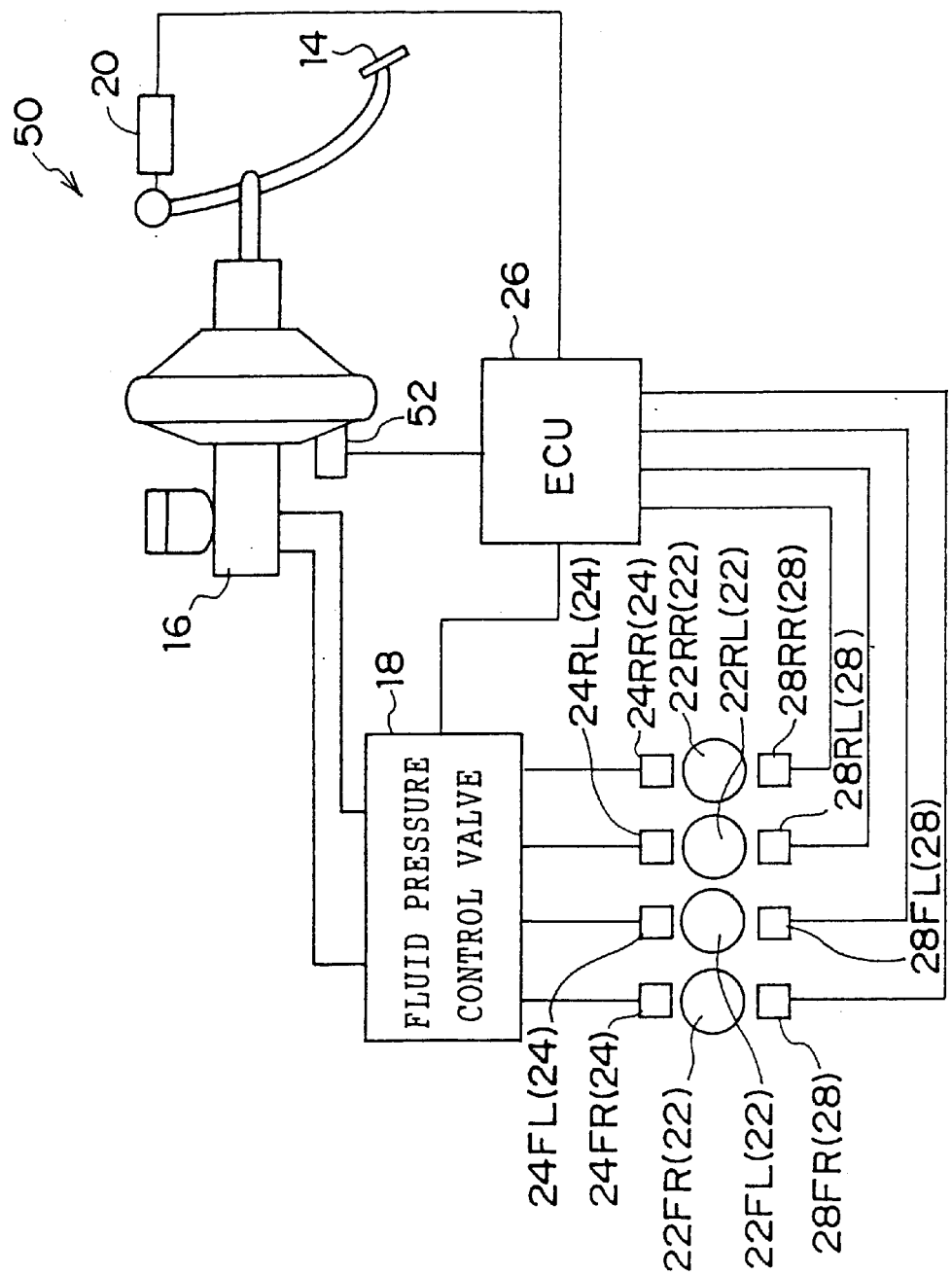
FIG. 11 is a schematic structural diagram showing another example of a braking device to which the present invention is applied.

Namely, in a braking device 50 shown in FIG. 11, a pressure control valve 52 is provided at a master cylinder 54 that is used in place of the master cylinder 16. Further, in the master cylinder 54, a chamber is provided that is different from chambers used in ordinary braking devices. In the ECU 26, pressure within this chamber is controlled by opening and closing the control valve 52 when BA control is effected, and fluid pressure supplied to the wheel cylinders 24 is increased.

Further, although the threshold Th and the assist amount Y are set on the basis of the road surface $\mu$ slope $D_o$ in the above embodiments, a standard value that is preset as has conventionally been the case may be used for one of the threshold Th and the assist amount Y so that at least one of the threshold Th and the assist amount Y is set on the basis of the road surface $\mu$ slope $D_o$.

That is, the threshold setting section 48 may be omitted from FIG. 1 and a preset standard value may be used for the threshold Th. In this case, it is preferable to set the threshold Th with respect to the rear wheels 22RR and 22R1 to be higher than the threshold Th with respect to the front wheels 22FR and 22FL.

Further, the assist amount setting section 34 may be omitted and BA control may be effected at BA control section 36 so that it becomes a preset assist amount. In this case, it is preferable to set the assist amount Y with respect to the rear wheels 22RR and 22R1 to be lower than the assist amount Y with respect to the front wheels 22FR and 22FL.

What is claimed is:

1. A braking force control device, the device comprising:
   braking means for braking wheels by a braking force generated in response to a braking operation during which a brake pedal is depressed;
   wheel speed detecting means for detecting wheel speed of a wheel;
   road surface friction coefficient slope estimating means for estimating a slope of a road surface friction coefficient with respect to a slip ratio of the wheel on the basis of the wheel speed detected by the wheel speed detecting means;
   braking operation condition detecting means for detecting a braking operation condition during which the brake pedal is depressed; and
   assist control means for assisting braking of the wheels by the braking means on the basis of the estimation results of the road surface friction coefficient slope estimating means and the braking operation condition detected by the braking operation condition detecting means, wherein the braking operation condition detecting means includes a determining means to determine whether or not the braking operation condition detected by the braking operation condition detecting means has exceeded assist conditions set on the basis of the estimation results of the road surface coefficient slope estimating means, and the assist control means assists braking on the basis of determination results of the determining means.

2. The braking force control device of claim 1, wherein the assist conditions are lowered when the road surface friction coefficient slope estimated by the road surface friction coefficient slope estimating means is high, and the assist conditions are raised when the road surface friction coefficient slope estimated by the road surface friction coefficient slope estimating means is low.

3. The braking force control device of claim 1, wherein assist conditions of rear wheels are set to be lower than assist conditions of front wheels.

4. The braking force control device of claim 2, wherein assist conditions of rear wheels are set to be lower than assist conditions of front wheels.

5. The braking force control device of claim 1, further including assist amount setting means for setting an assist amount at the time braking of the wheels is assisted on the basis of estimation results of the road surface friction coefficient slope estimating means, and the assist control means assists braking at the assist amount set by the assist amount setting means.

6. The braking force control device of claim 2, further including assist amount setting means for setting an assist amount at the time braking of the wheels is assisted on the basis of estimation results of the road surface friction coefficient slope estimating means, and the assist control means assists braking at the assist amount set by the assist amount setting means.

7. The braking force control device of claim 3, further including assist amount setting means for setting an assist amount at the time braking of the wheels is assisting on the basis of estimation results of the road surface friction coefficient slope estimating means, and the assist control means assists braking at the assist amount set by the assist amount setting means.

8. The braking force control device of claim 4, further including assist amount setting means for setting an assist amount at the time braking of the wheels is assisted on the basis of estimation results of the road surface friction coefficient slope estimating means, and the assist control means assists braking at the assist amount set by the assist amount setting means.

9. The braking force control device of claim 5, wherein the assist amount is made large when the road surface friction coefficient slope estimated by the road surface friction coefficient slope estimating means is high, and the assist amount is made small when the road surface friction coefficient slope estimated by the road surface friction coefficient slope estimating means is low.

10. The braking force control device of claim 9, wherein the assist amount setting means corrects the assist force, while braking of the wheels is assisted, on the basis of estimation results of the road surface friction coefficient slope estimating means.

11. The braking force control device of claim 9, wherein the assist amount setting means corrects the assist force, while braking of the wheels is assisted, on the basis of estimation results of the road surface friction coefficient slope estimating means.

12. The braking force control device of claim 5, wherein an assist amount of rear wheels is set to be smaller than an assist amount of front wheels.

13. The braking force control device of claim 9, wherein an assist amount of rear wheels is set to be smaller than an assist amount of front wheels.

14. The braking force control device of claim 10, wherein an assist amount of rear wheels is set to be smaller than an assist amount of front wheels.

15. The braking force control device of claim 1, wherein only braking of the front wheels is assisted when an estimation result of the road surface friction coefficient slope estimating means is low.

16. The braking force control device of claim 4, wherein only braking of the front wheels is assisted when an estimation result of the road surface friction coefficient slope estimating means is low.

17. The braking force control device of claim 2, wherein only braking of the front wheels is assisted when an estimation result of the road surface friction coefficient slope estimating means is low.

18. The braking force control device of claim 3, wherein only braking of the front wheels is assisted when an estimation result of the road surface friction coefficient slope estimating means is low.

* * * * *

UNITED STATES PATENT AND TRADEMARK OFFICE
CERTIFICATE OF CORRECTION

PATENT NO. : 6,729,697 B2
DATED : May 4, 2004
INVENTOR(S) : Yoshiyuki Yasui et al.

It is certified that error appears in the above-identified patent and that said Letters Patent is hereby corrected as shown below:

Title page,
Item [56], References Cited, FOREIGN PATENT DOCUMENTS, change "JP 8-234414" to -- JP 8-324414 --;

Column 14,
Line 58, change "claim 9" to -- claim 5 --.

Signed and Sealed this

Eighth Day of February, 2005

JON W. DUDAS
*Director of the United States Patent and Trademark Office*